Sept. 21, 1954  J. F. KALBACH ET AL  2,689,949
TELEMETERING SYSTEM
Filed May 15, 1952  13 Sheets-Sheet 2

WITNESSES:
Henry Heyman
Louis F. Jacot

INVENTORS:
John F. Kalbach
Charles Wilkin Johnstone
BY
Roland A. Anderson
Attorney Sept. 21, 1954  J. F. KALBACH ET AL  2,689,949
TELEMETERING SYSTEM
Filed May 15, 1952  13 Sheets-Sheet 3

WITNESSES:
Henry Heyman
Louis F. Jantz

INVENTORS:
John F. Kalbach
Charles Wilkin Johnstone
BY
Roland A. Anderson
Attorney

WITNESSES:

INVENTORS:
John F. Kalbach
Charles Wilkin Johnstone
BY

Sept. 21, 1954  J. F. KALBACH ET AL  2,689,949
TELEMETERING SYSTEM
Filed May 15, 1952  13 Sheets-Sheet 8

WITNESSES:
Henry Heyman
Louis F. Jacot

INVENTORS:
John F. Kalbach
Charles Wilkin Johnstone
BY
Roland A. Anderson
Attorney Sept. 21, 1954  J. F. KALBACH ET AL  2,689,949
TELEMETERING SYSTEM Filed May 15, 1952  13 Sheets—Sheet 13

WITNESSES:
Henry Heyman
Louis F. Jacot

INVENTORS:
John F. Kalbach
Charles Wilkin Johnstone
BY
Roland A. Anderson
Attorney Patented Sept. 21, 1954

2,689,949

UNITED STATES PATENT OFFICE 2,689,949

TELEMETERING SYSTEM

John F. Kalbach, Pasadena, Calif., and Charles Wilkin Johnstone, Los Alamos, N. Mex., assignors to the United States of America as represented by the United States Atomic Energy Commission Application May 15, 1952, Serial No. 287,876

18 Claims. (Cl. 340—183)

This invention relates to communication systems and, more particularly, to multi-signal telemetering systems.

It is a frequent occurrence in the practical operation of machinery that certain functions of the machinery must be observed and controlled from a remote location. Very high voltage generating machinery, such as Van de Graaff generators, fall within this category and impose additional problems because of the presence of exceedingly high voltages.

The present invention concerns itself with a multi-function telemetering system for controlling and observing a large number of items in the high voltage electrode. It is stressed, however, that this telemetering system is not necessarily limited to the herein described application to a Van de Graaff generator, but is applicable to the observation and control of remotely located apparatus or machinery of any description.

The number of items to be controlled or observed in the case of a Van de Graaff generator are more than sixteen. Consequently, although other applications for a telemetering system may involve more or less items, the present explanation is directed to a four channel system capable of carrying more than sixteen different signals. Further, the exceedingly high voltage nature of the Van de Graaff generator application prohibits the use of wired links; and the presence of static discharges prohibits the successful use of electromagnetic waves of the radio frequency type. Consequently, the system herein described utilizes light beam transmission although it is to be understood that other applications of the invention may utilize any known system of transmission. In any case, only one carrier medium in each direction between the observation or control room and the machinery is utilized. This requires the time-sharing of the carrier medium by a plurality of different signals. In order that the signals between the transmitting and receiving equipment will, under no circumstances, become out of synchronism, a coded channel system is needed.

Accordingly, it is an object of this invention to provide a telemetering system which communicates a plurality of items of information with complete reliability.

It is another object of this invention to provide a system of multi-signal communication which utilizes only one carrier in each direction.

Still another object is to provide a telemetering system which utilizes a light beam link between the transmitter and receiver.

Another object is to provide a telemetering system which effects high voltage isolation.

Still another object is to provide a telemetering system which has no susceptibility to interference from electric flash-overs.

Another object of the invention is to provide a communication system having a plurality of channels each of which has a distinctive code of impulses.

Another object of this invention is to provide a communication system in which intelligence quantities are proportional to the duration between the channel identifying code and a signal impulse.

Still another object of the invention is to provide a telemetering system comprising a plurality of channels arranged to transmit both constant and alternating quantities simultaneously in said channels.

Still another object is the provision of a novel multiplexing system in which a plurality of direct current quantities can be communicated in the space allotted to any one signal in any channel.

These and other objects will become apparent from the following description taken with reference to the drawings which are made a part of this specification.

Figure 13:
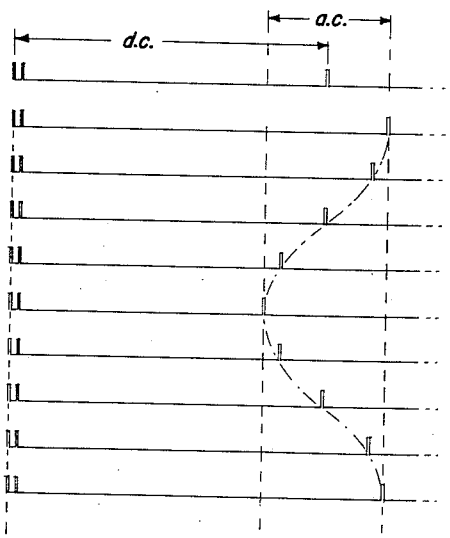
Figure 14:
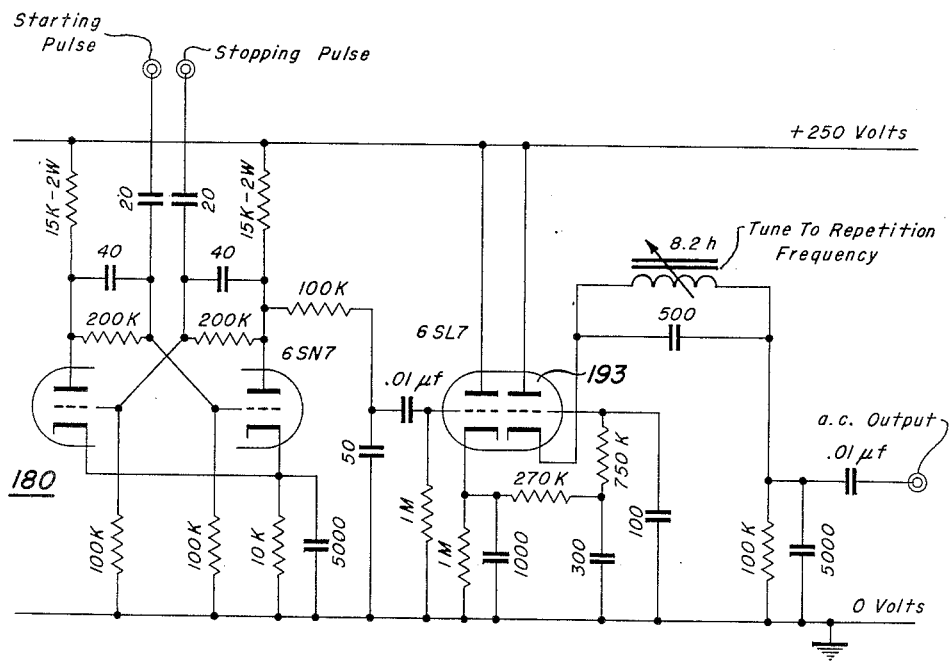
Figure 15:
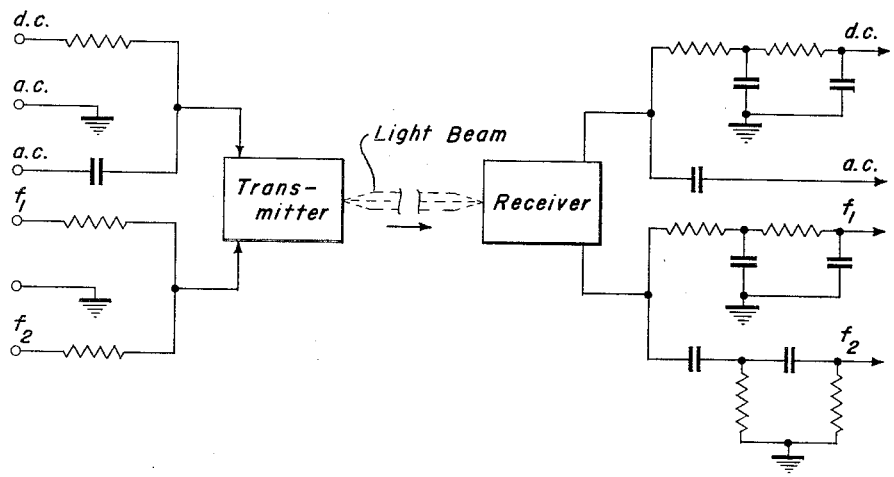
Figure 15:
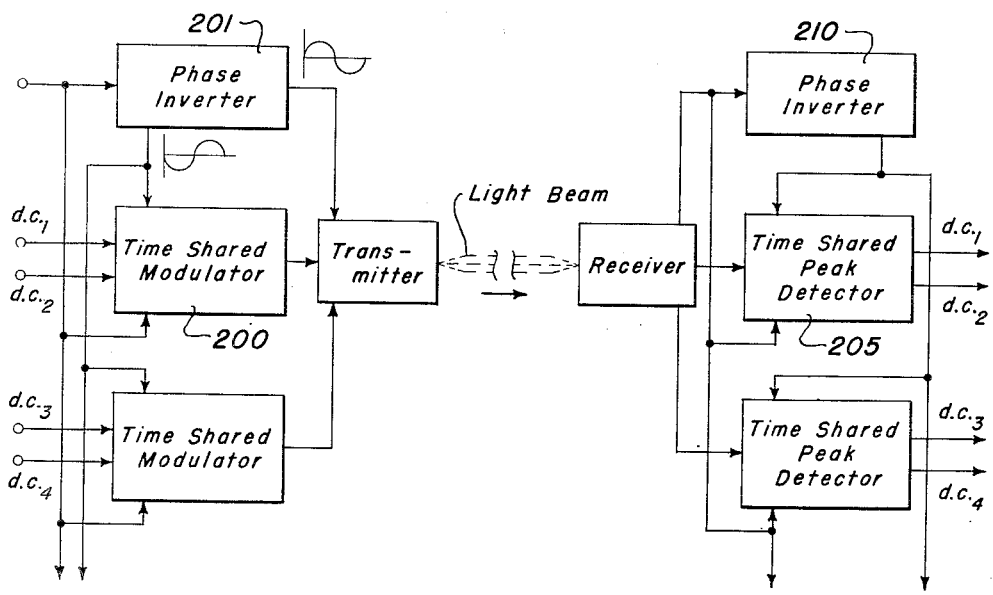
Figure 16:
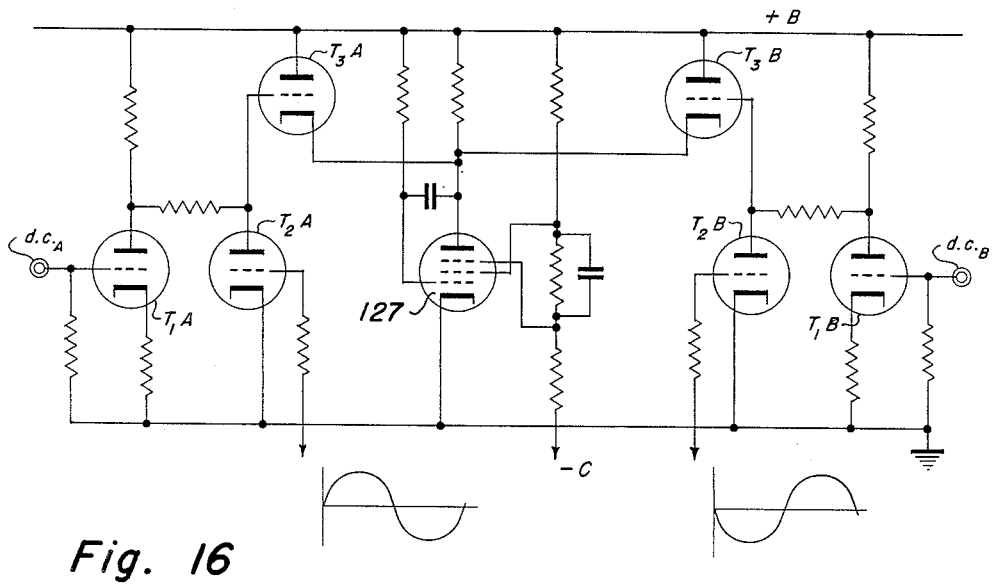
Figure 17:
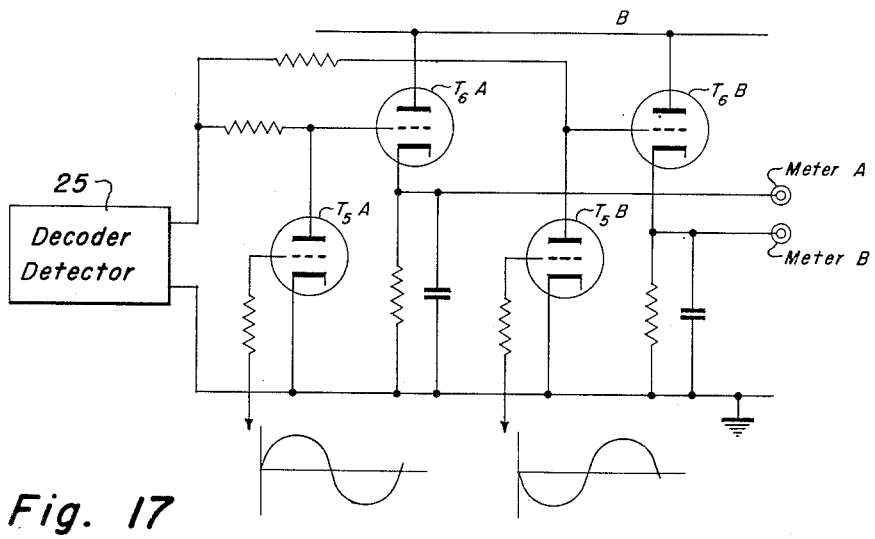
Figure 18:
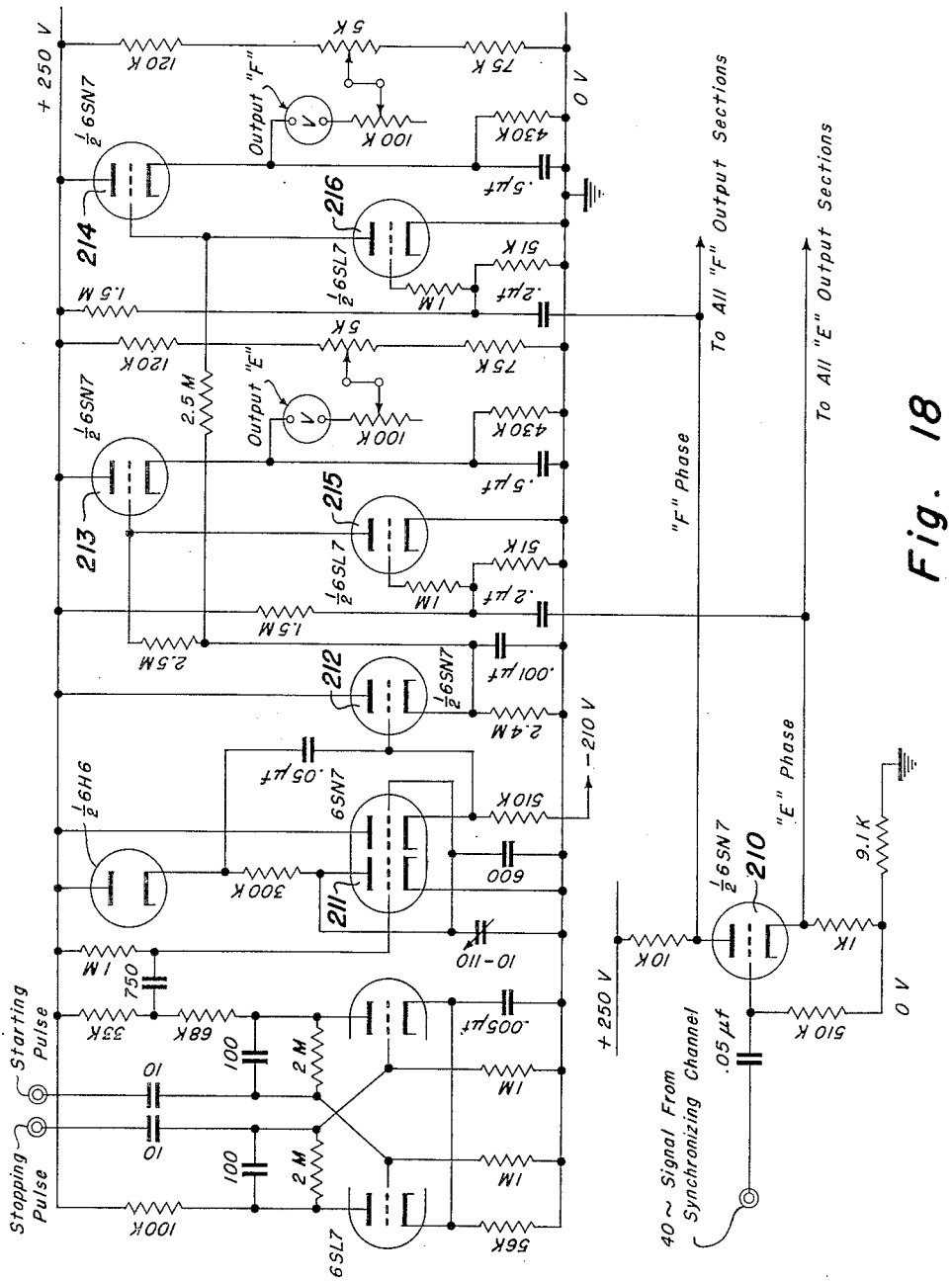

Figure 13 is a second chart useful in explaining the mode of simultaneously transmitting A. C. signals along with a D. C. signal;

Figure 14 is a schematic of a detector for use when only A. C. signals are transmitted;

Figure 15 is a block diagram showing the mode of connections for transmitting several A. C. or D. C. or A. C. and D. C. signals in the channel time space alloted to one signal;

Figure 16 is a schematic diagram showing a transmitter time-sharing system for two direct current signals;

Figure 17 is a schematic diagram of a portion of the time-shared rectifier in the receiver, and Figure 18 is a schematic of an actual time-shared rectifier in the receiver.

Figure 1:
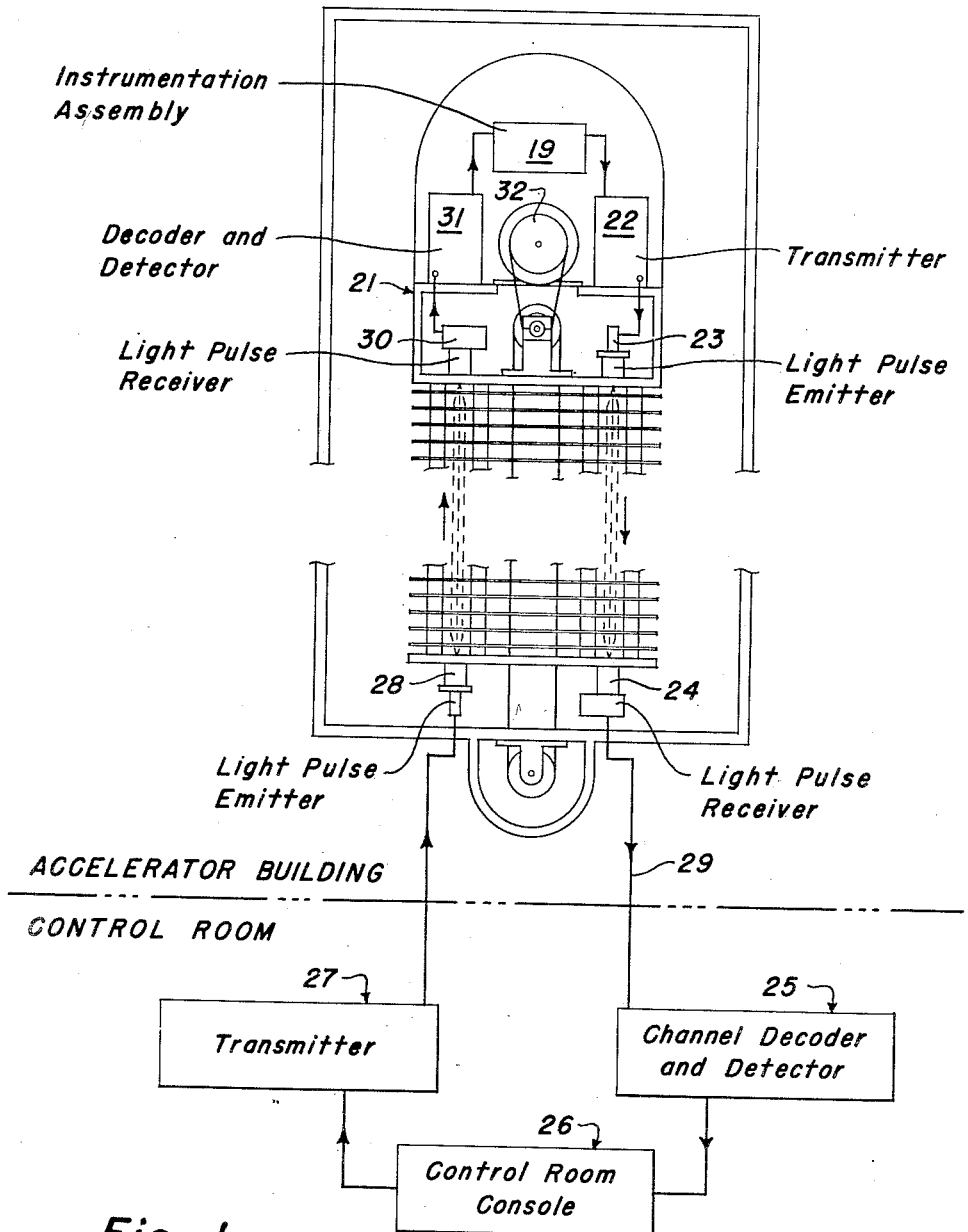
Figure 1 is a diagrammatic showing of the telemetering system of this invention as utilized in a Van de Graaff installation.

The major components of the telemetering system and their relation one to another are described with reference to Figure 1.

The transmission in the direction from the Van de Graaff to the control room utilizes a transmitter 22 having a light beam emitter 23 supported at the high voltage head of the Van de Graaff generator 21. A light-sensitive receiver 24 is supported in the light beam path at the foot of the Van de Graaff generator. A transmission line 29 connects the receiver to a channel decoder and detector 25 which is connected to appropriate instruments on the control room console 26.

The motive power for the electronic equipment and controls positioned at the high voltage head is provided by a generator 32 driven off the upper Van de Graaff belt trunnion.

The telemetering system in the reverse direction is essentially the same as described in the preceding paragraphs except that somewhat different modulation techniques may be utilized in order to manipulate devices at the head of the Van de Graaff generator from the control room. Specifically, transmitter 27 generates pulses corresponding to intelligence derived from control room console 26; the pulses are impressed on light emitter 28; the light is beamed to light pulse receiver 30, the intelligence is decoded in decoder-detector 31 and is utilized in the instrumentation assembly 19.

Figure 2:
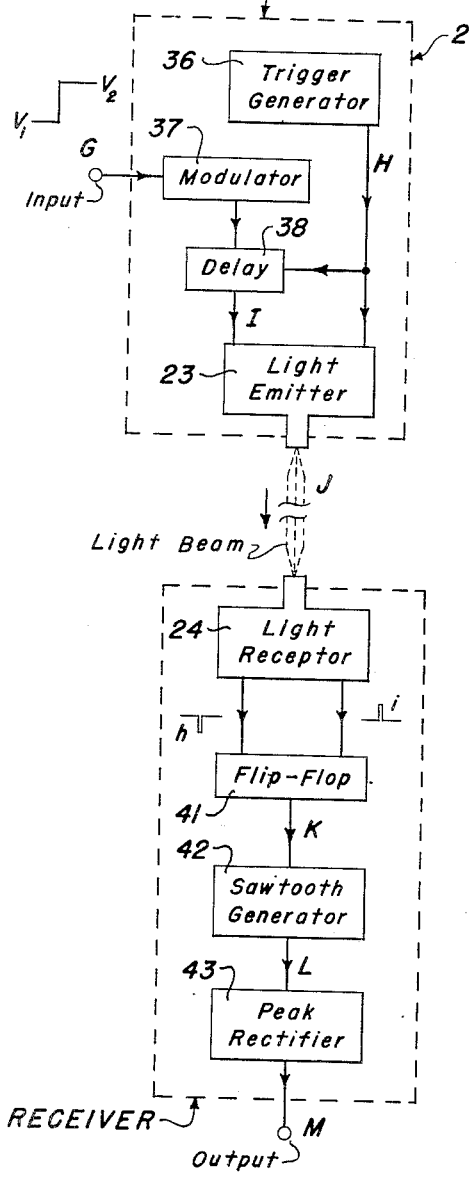
Figure 2 is a block diagrammatic representation of a single channel system presented for purposes of explanation.
Figure 2:
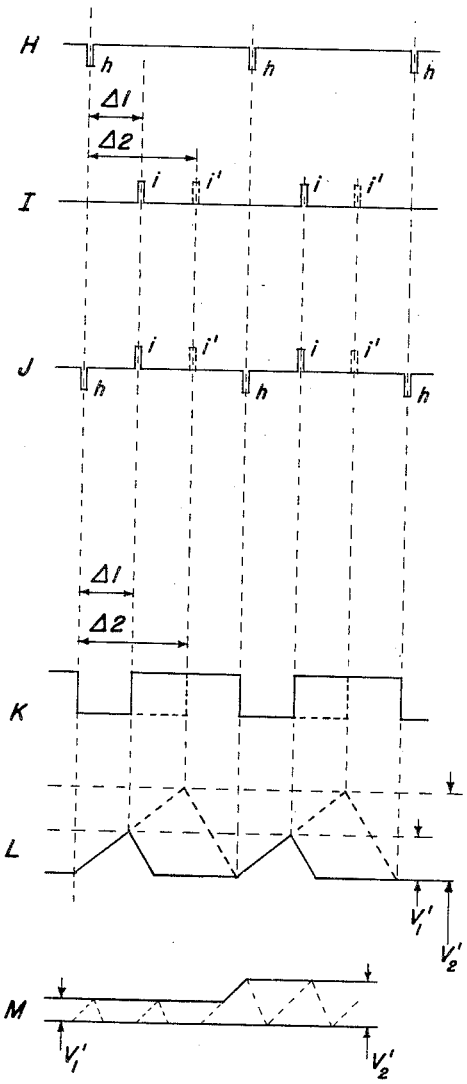

The understanding of the multi-signal system will be facilitated by a brief description of the principles of this invention applied to a single-channel system. This simplified system is shown in Figure 2.

Two types of pulses are the minimum required for a single-channel system. These types are channel coding trigger pulses and delayed or signal pulses, repeated alternately at a selected repetition rate. The two pulses must be distinguishable in some way, as for example, by different amplitudes or widths, or as shown in Figure 2, by opposite polarity. The interval or "delay" between the two pulses is a function of an observed quantity which may be a voltage.

In order to distinguish between those pulses which initiate time durations and those pulses which terminate durations measured from the former, the former pulses are termed "channel coding" pulses and the latter are termed "signal" pulses.

The transmitter 22 comprises a trigger generator 36; a modulator 37, a delay system 38, and a light emitter 23. The trigger generator 36 generates a pulse at even intervals. These pulses are fed both to the light emitter 23 and to the delay system 38. The delay system operates to delay each signal pulse for an interval of time depending on the signal voltage impressed on modulator unit 37. The time interval between each original pulse and the corresponding delayed pulse is accordingly a function of the amplitude of the intelligence to be transmitted. The two sets of pulses are impressed on light emitter 23 and transmitted as intensified or diminished variations from the normal intensity of the light emitted. The relation of the channel identifying pulses and the delayed pulses is explained, infra, and is shown in the chart to the right of the light emitter. For brevity, these variations in intensity are henceforth termed "positive" or "negative" light pulses.

After transmission over the modulated light beam, the pulses are received in light-sensitive receiver 24, amplified, separated and used to control a flip-flop circuit 41 in such a way that a square wave of voltage is generated whose duration corresponds to the duration between each original channel pulse and each signal pulse. The square wave pulses are applied to a sawtooth wave generator 42 so that sawtooth voltages having an amplitude corresponding to the length of the square waves are generated. The sawtooth potentials are rectified in peak detector 43. An output is obtained which is a relatively steady voltage which will have an amplitude corresponding to the input or modulating voltage applied to modulator 37 in the transmitter.

The voltage impulse charts to the right of the equipment components in Figure 2 serve to explain the mode of operation. Trigger generator 36 generates negative pulses $h$ at even intervals as shown in chart H. These pulses are also applied to delay component 38 wherein they are delayed for intervals depending on the amplitude of the modulating potential generated in modulator 37 and the modulating potential, in turn, is a function of the value of the observed input potentials identified as $V_1$ and $V_2$. That is, a potential $V_2$ of greater amplitude than $V_1$ causes a proportionally greater delay as shown by $i'$ compared to $i$ in chart I. Both the original pulses and the delayed pulses are combined, as shown in chart J, and are applied to light emitter 23 to be transmitted over the light beam to the light-sensitive receiver 24. The initial or channel identifying pulses are used to start flip-flop circuit 41 and the delayed or signal pulses are used to return the flip-flop circuit to its original state. It follows that the length of the square wave from the flip-flop circuit is a function of the delay time between an original pulse and the corresponding delayed pulse. The length of the square wave is shown in chart K and is equal to 1 or 2 which, in turn, corresponds to $V_1$ or $V_2$. The flip-flop circuit starts and stops a sawtooth generator 42. The sawtooth wave has an amplitude corresponding to the length of the square wave and the amplitude is shown as $V^1_1$ or $V^1_2$ in chart L. The sawtooth wave is peak rectified to give an output voltage $V^1_1$ or $V^1_2$ which corresponds to the original input potentials $V_1$ or $V_2$.

In order to expand the principle of the simple system to a system for carrying a larger number of pieces of information over a single light beam, means must be employed which will channelize or identify each of the pieces of information at the receiving end. In addition, because misinformation due to failure of synchronism cannot be tolerated, a simple progressive or sequence system is not satisfactory.

Figure 3:
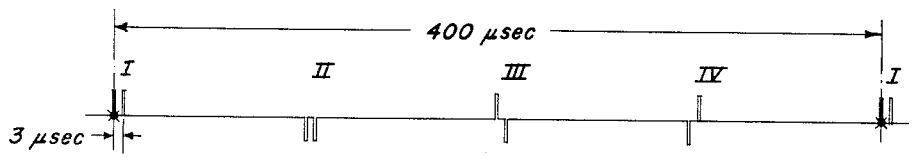
Figure 3 is a chart showing the channel identifying coding pulses in a four-channel multiple signal system.
Figure 4:
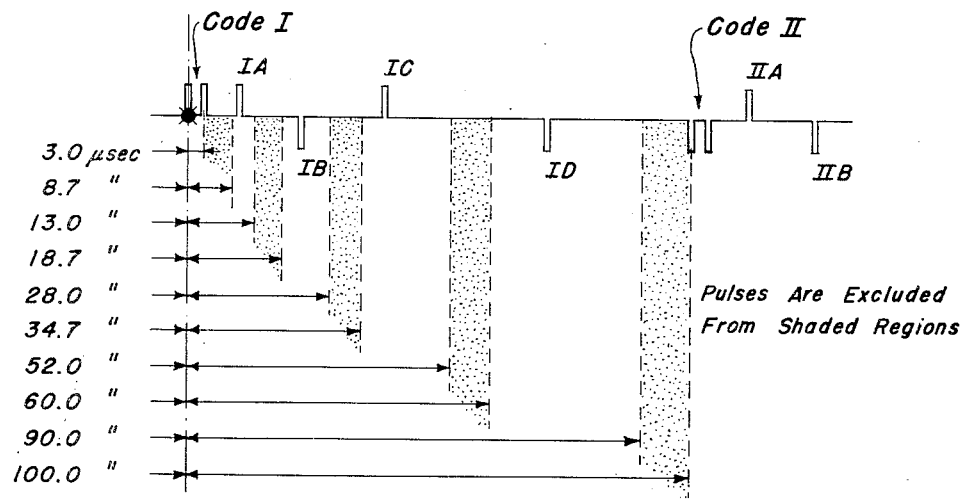
Figure 4 is a chart showing the channel identification coding pulses and the time space allotted to the signal pulses.
Figure 5:
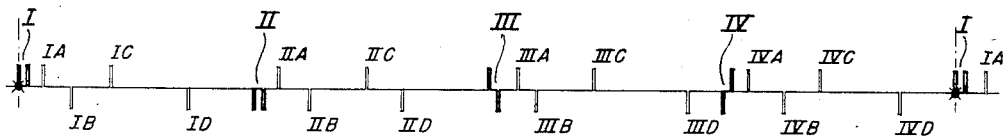
Figure 5 is a chart showing the identification of four channels and four signals in each channel.

The present invention obviates any possibility of cross channelizing by the use of four distinct channel identifying pulse codes which are shown in Figure 3. The particular sequence of the various codes is a matter of choice, but for purposes of explanation, the first, second, third and fourth channels are identified by a pair of positive pulses; a pair of negative pulses; a positive pulse followed by a negative pulse, and a negative pulse followed by a positive pulse, respectively. These channel-identifying code pairs are separated by regular intervals during which the information or signal pulses are presented. The information pulses following each identifying code pulse pair are identified by the letters A, B, C or D with an appropriate channel identifying prefix as shown in Figures 4 and 5. The signal pulses are alternately positive and negative, and for reasons to become apparent later, the delay times of pulses of the same polarity in a given group are sufficiently different one from another to be separately distinguished by flip-flop circuits having different resolving times.

The pulses emitted from the transmitter by the glow tube emitter have a duration of about 2 microseconds in the preferred embodiment. The spacing of the two pulses in each code pair is 3 microseconds. The time duration between channel code pairs is 100 microseconds.

It is understood that the duration given to any of the pulses and the interval between pulses is a matter of selection depending on the traffic for which any particular system is designed. For simplicity in explanation and as an aid in the practical application of this invention, values are herein given to time durations utilized in the selected embodiment.

The four channels are delineated by the four code pairs and each channel is utilized to handle at least four signals. The entire cycle of four code pairs and the plurality of signals is repeated 2500 times per second.

In order to keep a clear separation between signals, the time relationships shown in Figure 4 are preferably maintained. Each signal pulse is allowed a ratio of maximum to minimum delay time of about 1.5 to 1, measured from the first pulse of the corresponding code pair. The pulse occurrence area and pulse exclusion areas are shown diagrammatically. An example of actual timing of the pulses is shown and it is to be noticed that the signal pulses are excluded from a region in the center of the time spacing allotted to two signals. Preferably, the pulse exclusion regions are chosen so that if signal and code pulses vary in timing by 2½ per cent, pulses other than those in the code pairs can never be closer than 5 microseconds. Consequently, this eliminates or prevents "false code" pairs which would disrupt the proper decoding sequence.

The actual mode of operation of the four channel transmitter-receiver system is now described with reference to Figures 6 and 7.

*The transmitter*

The transmitter 22 comprises a timer 50 which cyclically generates four pulses of like polarity, each on a separate output terminal as shown in chart N. The pulses are applied to a coder 51 which, in a manner presently to be described, converts the four original pulses into four different code pairs as shown in chart O.

In order for intelligence to be transmitted, signal pulses must be inserted after the first pulse of each corresponding channel coding pair with a time spacing therebetween which corresponds to the quantity to be communicated. This is accomplished in the first channel by applying the first pulse from the timer 50 to each of four time modulating delay units IA, IB, IC and ID. This terminology means that four signals are being processed in channel I, that is, in the interval between the first and second code pair. The modulating delay units are so arranged internally that a signal following the code pair has the selected polarity and occurs after a duration following the first pulse of the code pair which corresponds to the signal amplitude impressed thereon. For example, signal IA occurs after the first pulse of code pair I with a delay time corresponding to the amplitude of the signal derived from modulator input IM. Signal B in the channel identified by code I follows the first pulse of code pair I after a duration corresponding to the amplitude of the signal applied on modulating delay unit IB, etc. The mixer circuit 56 is such that it is preferable to apply signal pulses to it with negative polarity, as shown in charts Q and R. The signal pulses from IA and IC modulating delay units are reversed in polarity in the mixer 56 so that these signals are emitted as positive pulses, whereas, the IB and ID pulses continue to be negative as shown in chart P.

Figure 6:
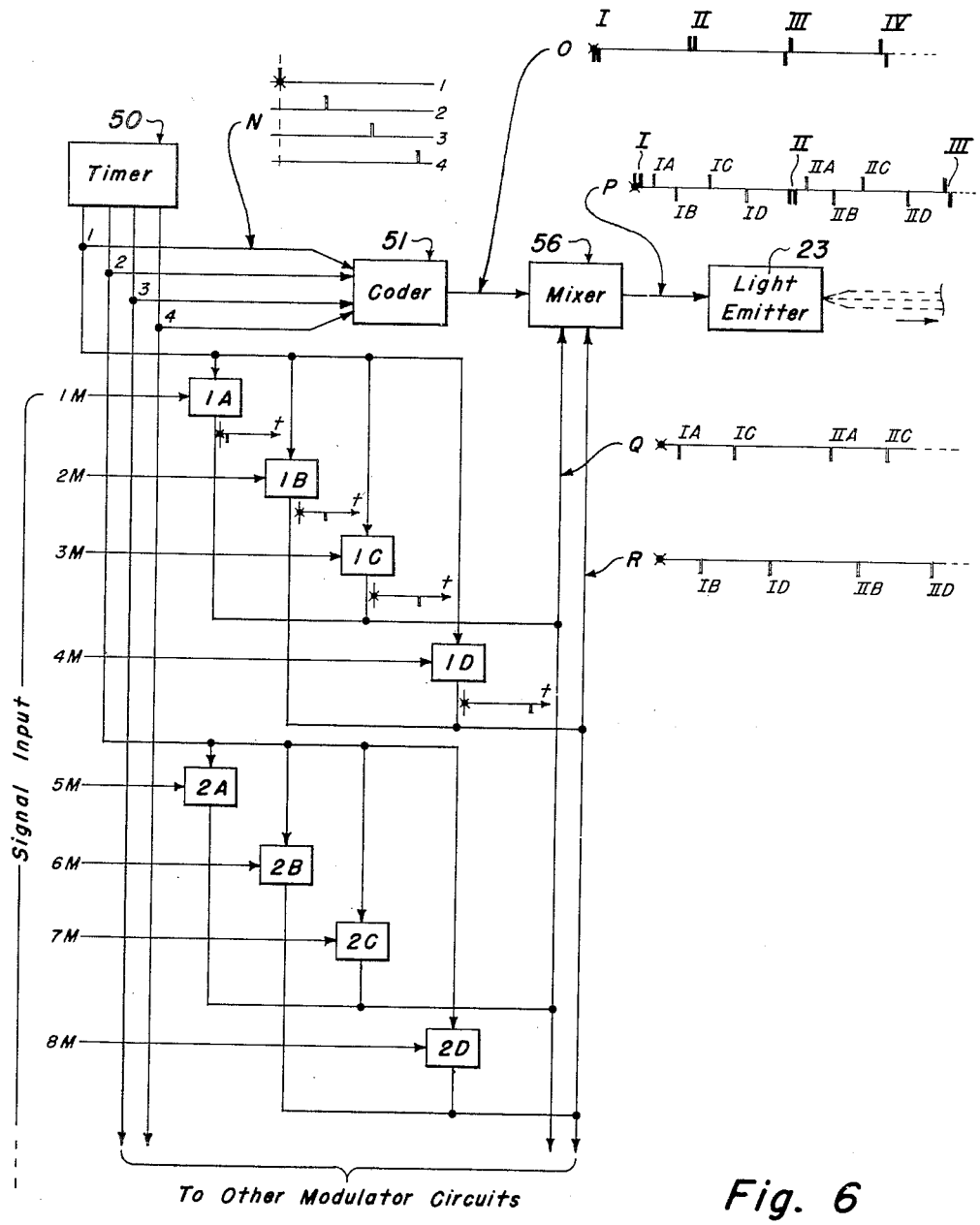
Figure 6 is a block diagram in part of the telemetering transmitter.

Figure 6 shows, in addition to all the components entering into the operation of channel I, the modulating delay units 2A, 2B, 2C and 2D in channel II. It is to be noted that the timing pulse for channel II is the second pulse emitted by the timer, that is, it is the pulse shown on line 2 of chart N.

The same type of arrangement is provided for channels III and IV by the provision of the same system of components.

The channel-identifying code pairs and the signal pulses are impressed on a lamp which then transmits the channel code pulses and signal pulses in sequence as light intensity pulses.

*The receiver*

The operation of the receiver and channel decoder detector is described with reference to Figure 7. The decoding process is explained with respect to channel I and it is to be understood that the process is similar for all channels.

The light beam impinges on photomultiplier receiver 24 and the electric potentials so derived are amplified in the two-stage amplifier 61. The combined channel code pulses and signal pulses are reproduced by the amplifier in original form as shown in chart S. These pulses are impressed on below cut-off biased stage 62 and appear in inverted form in the output as shown in chart U. Stage 62 processes all input positive pulses which in channel I are code I and signals IA and IC. The output signals from amplifier 61 are also applied to an inverter 63 and then applied, as shown in chart T, to below cut-off biased stage 64. Again, only the positive input pulses are reproduced, as shown in chart V, and these also are in inverted form. Thus, signal pulses IB and ID are reproduced.

It is to be noted that from the pulses so derived, only the signal pulses are utilized. The channel coding pulses are not in usable form at this stage and are simply surplus.

The signal pulses are utilized to mark the end of each corresponding duration. Accordingly, the pulses necessary to start each respective duration are yet to be derived.

The starting pulses are the channel coding pulses. It is recalled that the four channel coding pulses in the preferred embodiment are a pair of positive pulses, a pair of negative pulses, a positive followed by a negative pulse, and a negative followed by a positive pulse, respectively. The pulses of each pair are separated by a fixed delay period which is 3 microseconds in the preferred embodiment.

It follows that if the first pulse of the first channel code pair is delayed 3 microseconds by a delay network and is impressed with positive polarity on one grid of a coincidence tube at the same time that the second pulse of the first channel code pair is directly applied with positive polarity to a second grid of the same coincidence tube, the coincidence tube will generate a pulse corresponding in time to the second pulse of the first channel code pair.

Figure 7:
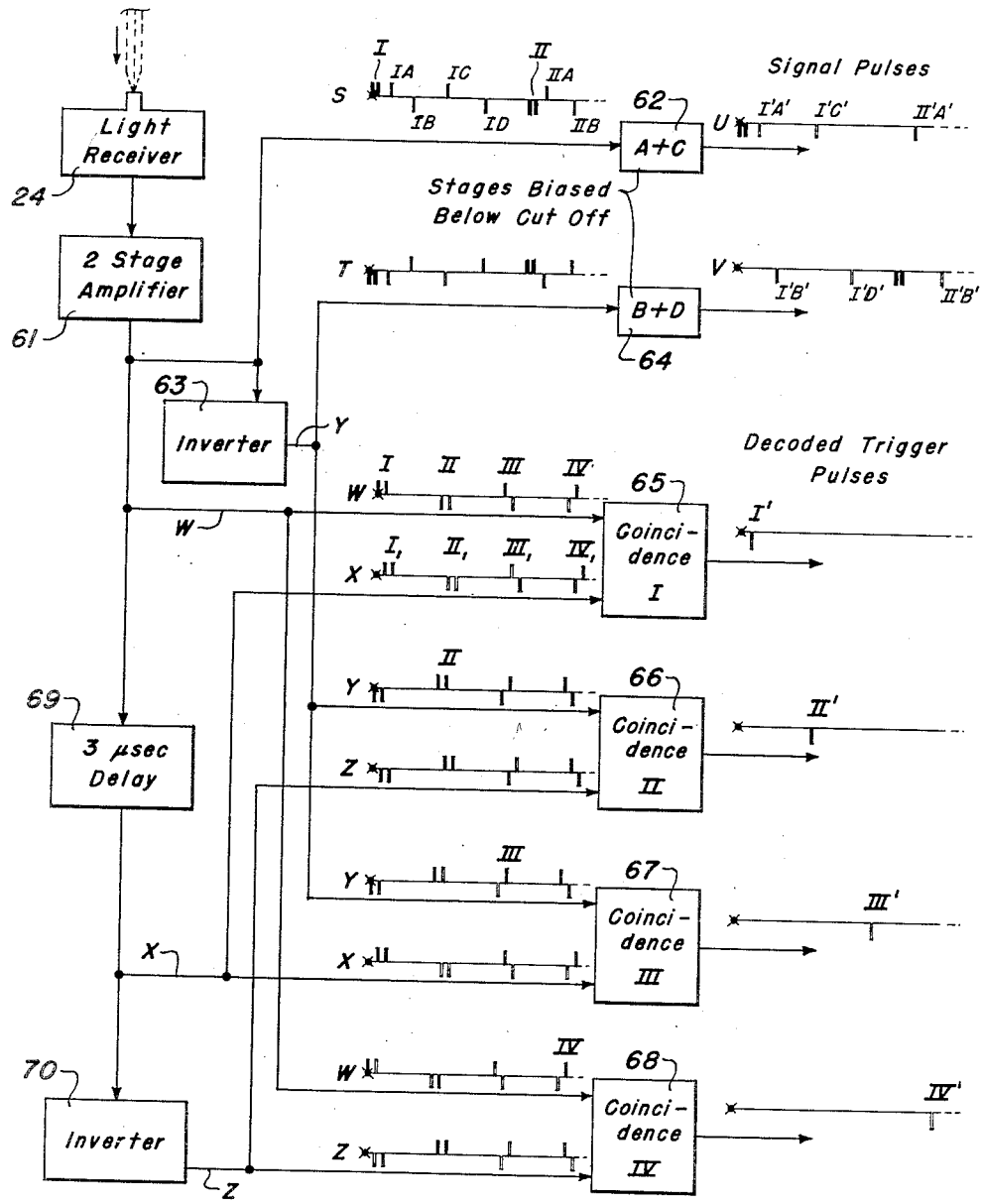
Figure 7 is a block diagram in part of the telemetering receiver showing the channel identifying decoding components.

For a clear explanation of how the channel coding pulses are separated and reproduced in usable form, reference is made to Figure 7.

The cut-off stages 62 and 64 reproduce the signal stop pulses. The channel code pulses are reproduced by coincidence circuits 65, 66, 67 and 68. Each coincidence circuit has a tube biased to cut-off by the action of two grids. Therefore, a separate positive pulse must be applied to each of the two grids simultaneously in order for the coincidence tube to conduct and generate one output pulse.

The pulses derived directly from amplifier 61 are applied directly to one grid of the coincidence tube in coincidence circuit 65. The form of channel coding pulses derived from amplifier 61 is as shown in chart W. The pulses from amplifier 61 are also applied to delay circuit 69 and emerge therefrom with a 3 microsecond delay. The positions of these pulses are indicated in chart X by suffixes applied to the respective channel pulse code identifictaion numbers. Since the original time spacing between each pair of channel coding pulses is the same as the time delay applied to the pulses in the delay network 69, it follows that there is coincidence between the second pulse of each pair of the original pulses and the first pulse of each pair of the delayed pulses. Consequently, only one output pulse can be obtained from coincidence circuit 65. By inspection of charts W and X, coincidence of positive pulses occurs only between channel code pulses I and I₁. Channel code pulses II and II₁ are negative so cannot activate the coincidence circuit 65. Channel code pulses III and III₁ give one negative pulse simultaneously with one positive pulse, and channel code pulses IV and IV₁ give one positive pulse coincident with one negative pulse. Therefore, coincidence circuit 65 can only give a starting pulse I' corresponding to channel coding pulse I, but delayed 3 microseconds.

The manner in which the second identifying channel code pair II is decoded is explained with reference to charts Y and Z. The channel pairs shown in chart Y are derived from the input amplifier 61 and inverter 63. Consequently, these code pulses have an identical time relation with the chart W group, but are inverted with respect thereto. The pulses in chart Z are derived from delay component 69 and inverter 70 so that they are delayed and inverted. Comparison between charts Y and Z shows that no coincident positive pulses occur corresponding to code pair I, but that there is coincidence between the second positive pulse of code pair II in chart Y and the first positive pulse of the delayed pulses of group II in chart Z. No coincident positive pulses occur for coding groups III and IV in the Y—Z chart combination. Consequently, an output pulse is derived only from the second coding group II, but delayed 3 microseconds from the first pulse thereof.

The third coding group is derived from coincidence circuit 67. The input pulses are a set of inverted pulses, as shown in chart Y, and a set of normal delayed pulses, as shown in chart X. The only pair of coincident positive pulses occur in group III. Consequently, coincidence circuit 67 delivers a single output pulse corresponding to channel code group III, but delayed 3 microseconds.

The fourth output code pulse is delivered by coincidence circuit 68 by the application thereto of one set of normal pulses, as shown in chart W, and one set of delayed and inverted pulses, as shown in chart Z. The only coincidence of positive pulses occurs in group IV.

As a result of the reproduction of the signal pulses and the channel timing pulses, a group of flip-flop circuits, one for each signal pulse, can be operated. The operation of the flip-flop circuits is shown in Figure 8.

Figure 8:
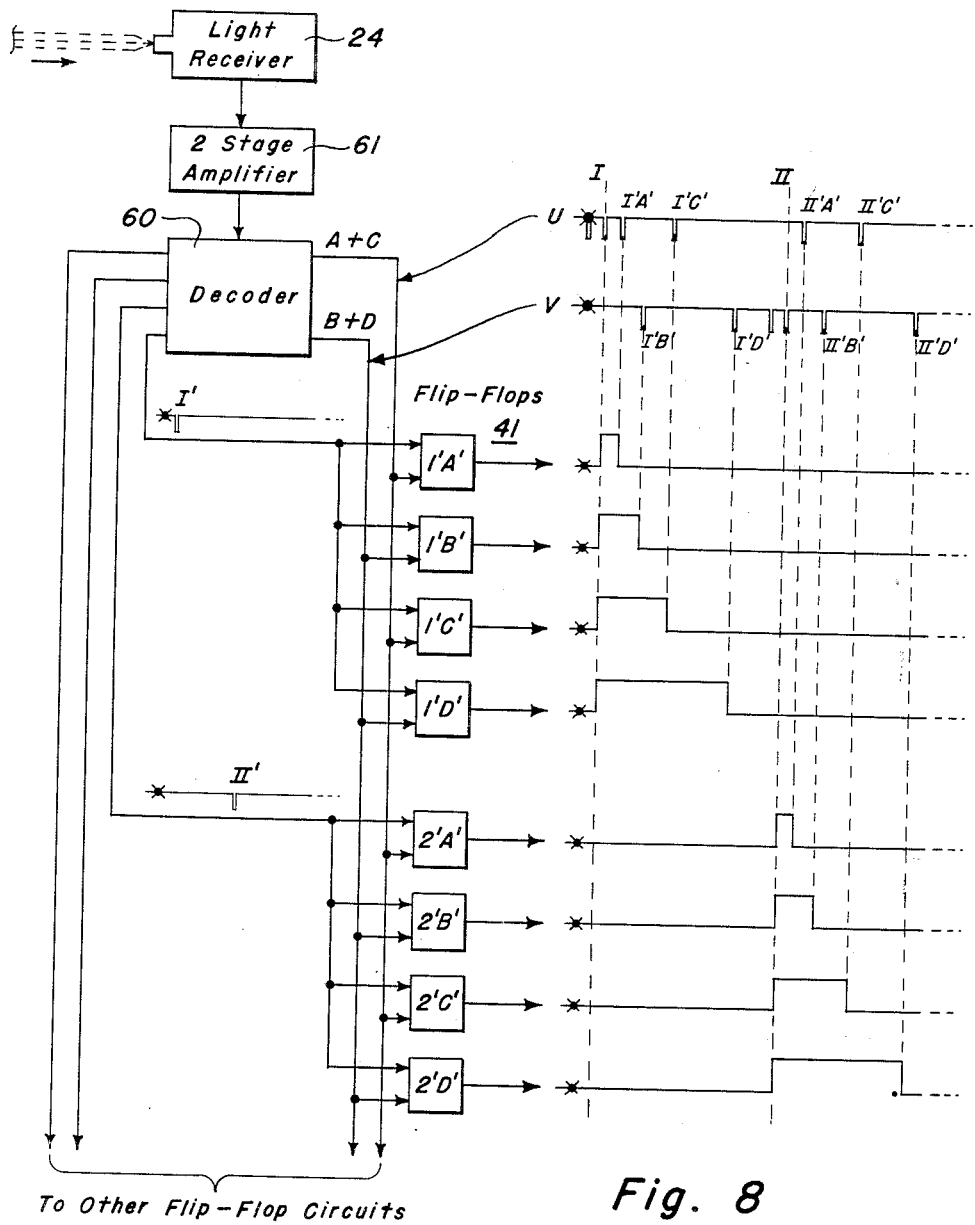
Figure 8 is a block diagram in part of the telemetering system showing the signal decoding components.

In Figure 8, the decoder 60 includes in block form all the components of Figure 7 less the light receiver 24 and the two-stage amplifier 61.

For ease in explanation, only the operation of channels I and II is shown and discussed. The operation of the remaining channels follows from an extension of the same principles. The output pulse of coincidence circuit 65 (Figure 7) for group I is the starting pulse for actuating four flip-flop circuits marked I'A, I'B', I'C' and I'D'. Flip-flop circuit I'A' has a resolution time which permits it to be returned to its original state by the time the A signal pulse occurs. Flip-flop circuits I'B', I'C' and I'D' have progressively longer resolving times than I'A' and so are unaffected by signal pulse A. Flip-flop circuit I'B' can respond to the B signal pulse, whereas, flip-flops I'C' and I'D' cannot. In corresponding order, flip-flop circuit I'C' responds to signal pulse C and flip-flop circuit I'D' responds to signal pulse D.

It is seen from the above discussion and the showing of Figure 8 that the respective decoded channel coding pulse flips all the flip-flop circuits in that channel, and each decoded signal pulse returns its corresponding flip-flop circuit to its original state. Therefore, a rectangular pulse is generated corresponding to the duration between the second of each original pair of the channel coding pulses and a signal pulse.

Each flip-flop circuit is connected to a sawtooth generator of the so-called bootstrap type. Thus, the peak value of the sawtooth potential so generated is linearly proportional to the length of the rectangular wave. The sawtooth generator is connected to a peak rectifier which delivers a steady state D. C. potential corresponding to the sawtooth peak value. A D. C. panel meter is connected to the peak rectifier. Conventional calibrating expedients are utilized to standardize each corresponding D. C. panel meter with the D. C. potential applied to the modulator at the transmitting end.

The operation of the telemetering system of this invention having been described in general terms, a specific preferred embodiment will now be described.

The transmitter (in detail)

Figure 9:
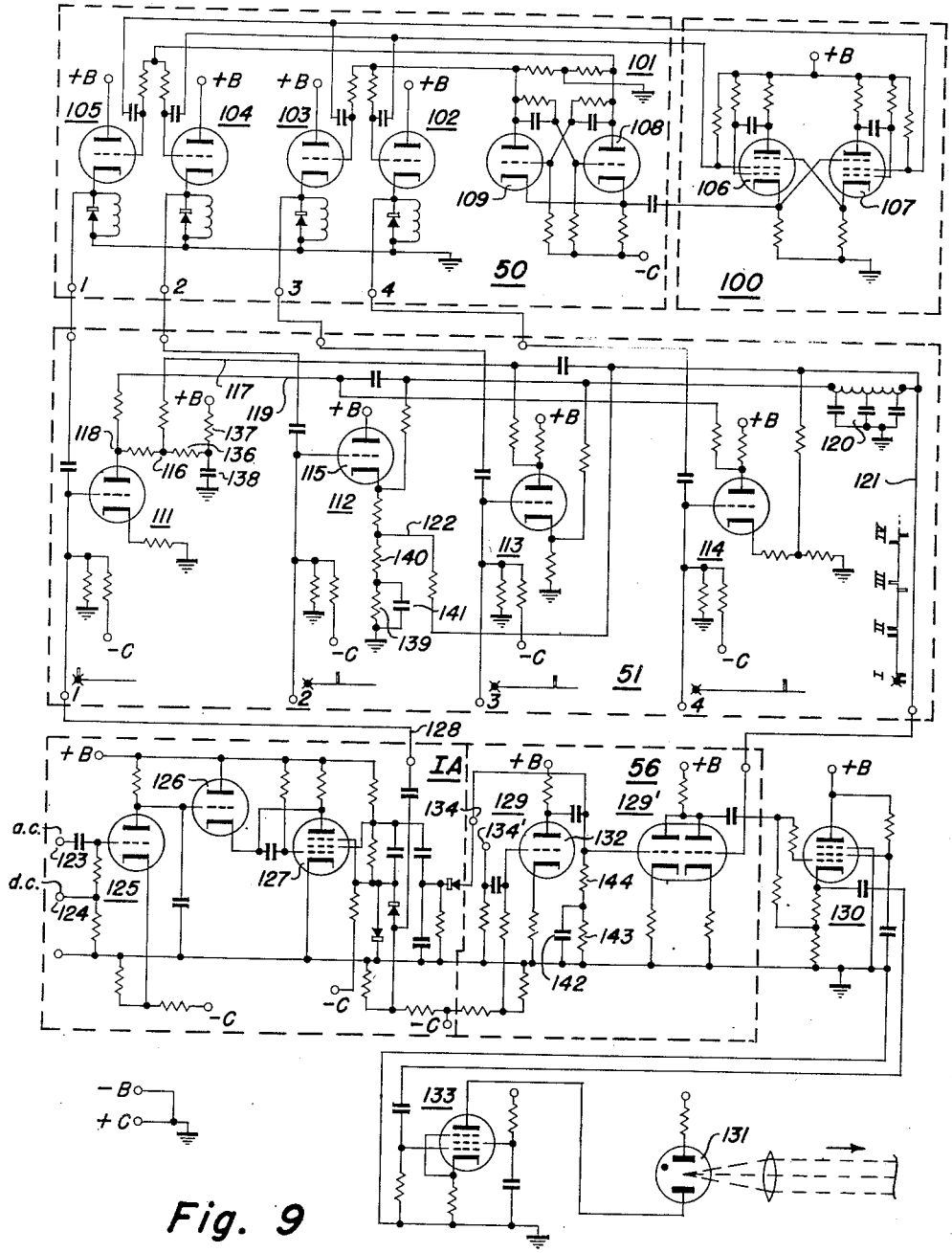
Figure 9 is a schematic diagram in part of a preferred embodiment of the transmitter.

Referring to Figure 9 of the drawings, a preferred embodiment of the transmitter is shown schematically.

The timing device 50 for the transmitter derives its timing pulses from a twin phantastron oscillator 100. This type of oscillator is noted for its linear behavior and constant timing. In the preferred embodiment, the components have such values that each half of the timing oscillator 100 "runs down" for 100 microseconds while the other half is recovering.

The timing oscillator is coupled to a scale-of-two 101 and a series of four pulse-forming stages 102, 103, 104 and 105. Each pulse-forming stage has an inductance in parallel with a rectifier in the cathode leg. Each inductance has a period selected to give a half-cycle wave form approximately ½ microsecond long. The rectifier in shunt with the inductance prevents ringing, i. e., the combination of inductance and rectifier creates only a clear positive pulse. The output of one phase of the timing oscillator is taken off tube 106 and impressed on the grids of the tubes in pulse-forming stages 102 and 104. The output of the other phase of the timing oscillator is taken off tube 107 and impressed on the grids of the tubes in pulse-forming stages 103 and 105. One output of timing oscillator tube 106 is taken off its cathode and impressed on the input of scale-of-two 101. The output of tube 108 of the scale-of-two controls the gating bias on pulse-forming tubes 104 and 105. The output of the other tube 109 of the scale-of-two controls the gating bias of pulse-forming tubes 102 and 103. Thus the phases of signals from the timing oscillator and the scale-of-two are mixed in a different combination on each grid of the four separate pulse-forming tubes 102, 103, 104 and 105, thereby resulting in four evenly spaced pulses, each on a separate conductor. The sequence of pulses is indicated by the numerals 1, 2, 3 or 4 adjacent the leads from the pulse-forming stages. Thus, for each cycle of operation of the timer, in the preferred embodiment, a total of 10,000 equally spaced pulses are generated, of which 2500 per second appear on each output terminal.

In order to distinguish each signal channel from the other channels, each channel is initiated by a distinctive code of two pulses. The manner in which this is accomplished is now described. The assembly of component devices used for the purpose is termed the "coder" and is generally designated by numeral 51.

A pulse from each of the pulse-forming stages 105, 104, 103 and 102 is impressed on amplifier stages, hereinafter termed coder stages, 111, 112, 113 and 114, respectively.

The pulse from pulse generator stage 105 is impressed on the input grid of the coder tube in stage 111. One output is taken off the tapped anode load resistor of coder stage 111 at 116. This output is impressed on manifold bus 117 for direct use. A second output is taken off the anode load resistor of coder stage 111 at 118 and is impressed on manifold bus 119 which is serially connected to delay line 120. The reason for taking the signal for the delay line circuit off the coder tube load resistor at a point closer to the anode than the connection for the through manifold bus 117 is to obtain output pulses of equal magnitude on the mixed signal bus 121. The delay line 120, in the present preferred embodiment, has a delay period of 3 microseconds. Consequently, from the single input pulse on coder stage 111, two negative pulses of equal magnitude and spaced by 3 microseconds are obtained on the mixed signal bus 121.

The next pulse, 100 microseconds later, is generated by pulse-forming stage 104 and is impressed on coder stage 112. The output pulses are taken from the cathode leg of tube 115 and so are positive. The pulses of lower amplitude are connected by conductor 122 directly to manifold bus lead 117 and from there to mixed signal bus 121. The pulse of higher amplitude passes to the mixed signal bus through delay line 120 and manifold bus 119. Therefore, two positive pulses spaced 3 microseconds apart appear on mixed signal bus 121 and constitute the second channel coding pair.

The third channel coding pair of pulses are obtained from pulse-forming stage 103 and coder stage 113. The first pulse is taken from the anode and is negative. The second pulse is taken from the cathode and passes through delay line 120. Therefore, the third channel coding pair is a negative pulse followed 3 microseconds later by a positive pulse.

The fourth channel coding pair is obtained from pulse-forming stage 102 and coder stage 114. The cathode pulse is led directly to the mixed signal line and the anode pulse is delayed. Therefore, the pair of pulses consist of a positive pulse followed in 3 microseconds by a negative pulse.

The sequence of channel coding pairs is impressed on one grid of two triodes in mixer stage 56. It is to be recalled that the coding pair establish the starting period for a duration to be terminated by the channel signal pulse.

The terminating channel signal pulse for channel I signal A is produced in modulator stage IA.

The observed signal voltage, whether D. C. or A. C., or both is impressed on the terminals 123 and 124, respectively, of amplifier stage 125. The variation in potential at the anode of the tube of stage 125 is directly impressed on triode 126 connected to a phantastron delay generator comprising tube 127 and associated components. The phantastron is first triggered by the channel pulse I through conductor 128 running to pulse-forming stage 105. The square wave pulses generated by the screen of the phantastron have a length very closely determined by the conductivity of tube 126 in shunt with the anode load resistor of phantastron tube 127. The conductivity of tube 126 is, in turn, determined by the input signal potential on input stage 125. From the foregoing, it is clear that phantastron 127 delivers a square wave having a duration linearly determined within selected limits by the magnitude of the observed potential on input terminal 123. The trailing edge of the phantastron pulse is differentiated, rectified and connected to mixer input terminal 134 to impress negative pulses on mixer stage 129'. Input terminal 134' and stage 129 are included in the mixer 56 to invert the trailing edge of the phantastron differentiated and rectified pulses when the light-emitted pulses are to be negative. A similar input modulator system is utilized for each signal to be handled. Therefore, in the embodiment shown, there are three more input modulators for channel I, and a similar system of four input modulators similarly connected to each of pulse-forming stages 104, 103 and 102 for signals in channels II, III and IV.

The channel coding pulses and delayed signal pulses are mixed in mixer 56, then delivered to amplifier stage 133 though cathode follower 130, and impressed on light source 131. The polarity of negative channel coding pulses and negative delayed signal pulse of channel I is reversed by tube 129' of mixer 56, and become positive pulses on the grid of tube 132 in stage 129. As a consequence, glow lamp 131 gives two channel coding positive intensity pulses and a delayed positive intensity pulse for channel I with signal IA.

The same techniques are extended so that three other delayed pulses, IB, IC and ID, follow signal IA in channel I. The system is similarly arranged for channels II, III and IV so that the final signal takes the form of Figure 5.

The light emitter 131 is a glow tube. A suitable commercial type is the Sylvania type R-1131C. This tube is capable of transmitting both positive and negative changes in intensity of approximately 2 microseconds in duration.

The light beam is collimated by a lens and directed through one of the Van de Graaff high voltage insulating columns to fall on the lens of the light pulse receiver in the receiving system.

*The receiver (in detail)*

Figure 10:
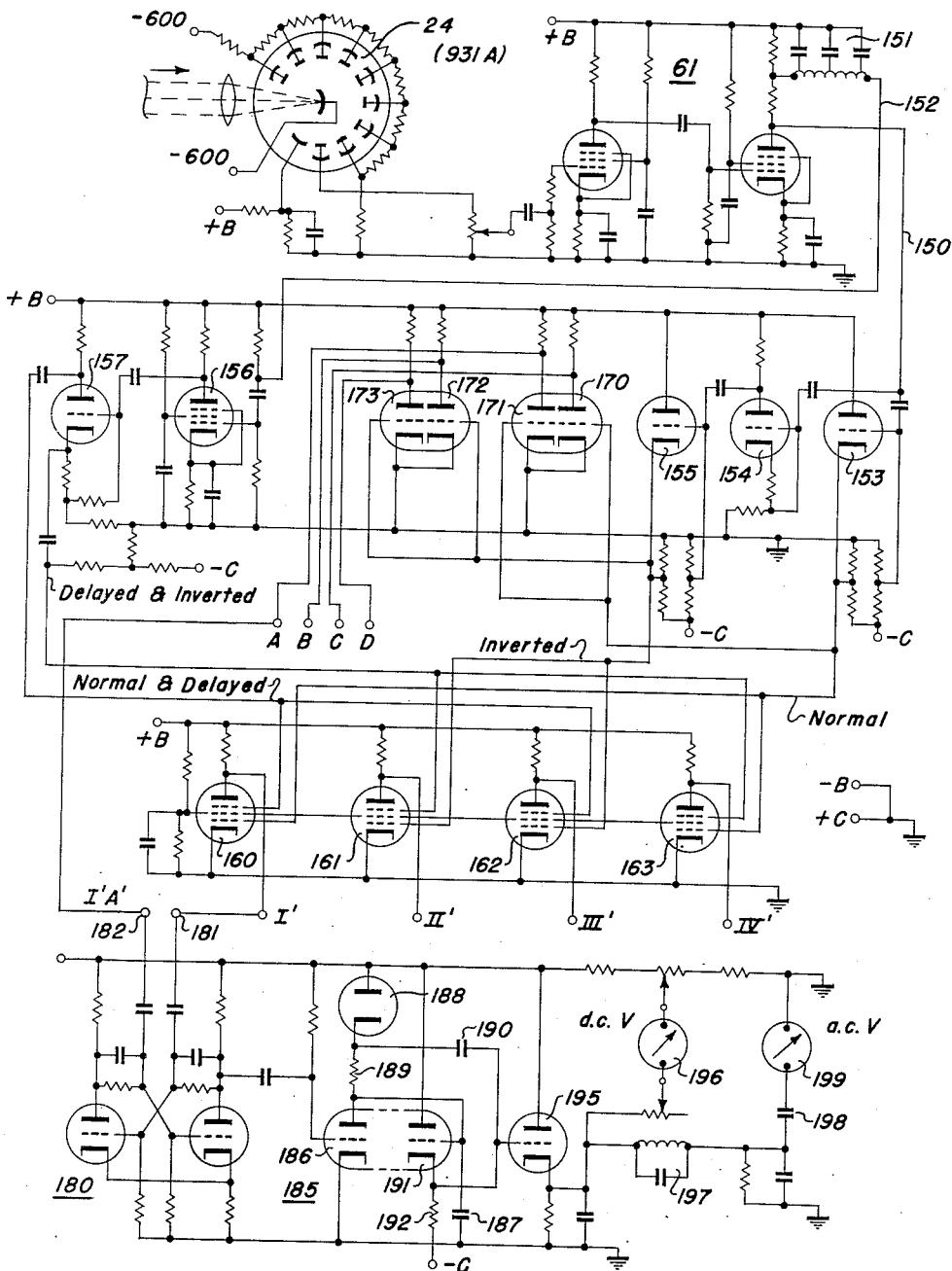
Figure 10 is a schematic diagram in part of the receiver.

A practical embodiment of the receiving system is shown in Figure 10. The light sensitive tube 24 is of the photomultiplier type. The pulses are taken off the ninth dynode in order to directly give the desired polarity of signal and are impressed on two-stage amplifier 61.

The output signal from the second stage is divided, one portion going directly into normal signal bus 150 and the other portion passed through 3 microsecond delay line 151 to delayed signal bus 152. The term "normal" means, like the original, that it is not delayed, inverted, or delayed inverted. The signals at this point on busses 150 and 152 are of original polarity. It is necessary to decode the four channel coding pairs into four distinct starting pulses corresponding to original codes I, II, III and IV. The normal signal bus 150 is coupled to the grids of tubes 153 and 154. Tube 154 acts as an inverter and is coupled to tube 155. A normal set of signals is taken off the cathode of tube 153 and an inverted set of signals is taken off the cathode of tube 155.

The delayed signal bus 152 is coupled into the two-stage amplifier comprising tubes 156 and 157. A normal delayed set of signals and a delayed inverted set of signals are taken off the anode and cathode of tube 157, respectively. These sets of signals are shown in charts W, X, Y and Z, respectively, of Figure 7. These signals are applied in four different combinations to coincidence tubes 160, 161, 162 and 163 in as many coincidence circuits.

The normal signal (as shown in chart W, Figure 7) is impressed on the first control grid of tubes 160 and 163. The normal inverted signal is impressed on the control grids of tubes 161 and 162. The delayed signal is impressed on the suppressor grids of tubes 160 and 162. The delayed inverted signals are impressed on the suppressor grids of coincidence tubes 161 and 163.

Referring again to Figure 7, it is noticed that the only coincidence between positive pulses derived from a normal set of signals and a delayed set of signals occurs between the channel code I second normal signal and the first of the code I delayed signals. Consequently, only coincidence tube 160 becomes conducting for the duration of one pulse width. The output pulse is denoted by I'.

Tube 161 is impressed with a set of delayed inverted pulses, and a set of inverted pulses. The only combination of coincidence between these sets of pulses shown in charts Y and Z of Figure 7 occurs for channel code pulse II.

A similar analysis of the circuit including coincidence tube 162 shows that channel code pulse III is decoded to give output starting pulse III'. Similarly, coincidence tube 163 generates an output pulse IV' corresponding to the fourth type of channel coding pulses.

It is apparent that both the signal pulses as well as the channel coding pulses are fed into the coincidence circuits, but the signal pulses are not used and do not cause trouble as long as the time sharing scheme of Figure 4 is observed. The signal pulses are the stop pulses for durations which are respectively correlated to transmitted quantities.

The useful signal or stop pulses are obtained from triodes 170, 171, 172 and 173. These tubes are biassed below cut-off and, consequently, are rendered conducting only by positive pulses. The control grids of tubes 170 and 171 are connected in parallel and to a source of normal signal from the cathode of tube 153. The control grids of tubes 172 and 173 are impressed with a set of inverted signals from tube 155. Consequently, the original positive signal pulses A and C are obtained on separate leads from tubes 170 and 171, and the original negative pulses B and D are obtained on separate leads from tubes 172 and 173.

The decoded channel starting pulse corresponding to I is derived from coincidence tube 160 and is impressed on terminal 181 of flip-flop circuit 180 to flip the same, and the stop pulse corresponding to the duration defined by original pulse I'A' is impressed on terminal 182 to return the flip-flop circuit to its original state. The square wave so generated has a length determined by the interval between the pulse I' and the signal pulse I'A'.

The square wave generated by flip-flop circuit 180 is impressed on sawtooth generator stage 185. The sawtooth generator is of the bootstrap variety and is of a type which is capable of large sweep amplitude and relative insensitivity to repetition frequency. Tube triode section 186 is utilized as a switch tube. Condenser 187 is directly in shunt with this tube. A charging resistor 189 is in series with switch tube 186 and condenser 187. A diode 188 in series with the charging resistor is utilized to supply an initial voltage at the supply end of resistor 189 at very nearly the supply potential.

Coupling condenser 190 connects between the cathode end of cathode resistor 192 and the grid of peak rectifier 195.

Operation of this circuit is as follows:

A negative pulse from flip-flop 180 open-circuits switch tube 186. The positive pulse from tube section 186 causes a sudden increase of current in tube section 191 and therefore in the cathode resistor 192. The positive potential from cathode resistor 192 raises the potential of the cathode of diode 188 above the supply potential, thereby open-circuiting the diode. The total charging current into condenser 187 now flows from condenser 190. The potential across condenser 187 rises at a linear rate thereby increasing the current through tube section 191 at a linear rate and, consequently, generating a linear rise of potential across cathode resistor 192. This potential continues to rise until a positive pulse from the flip-flop on the grid of tube section 186 short circuits condenser 187 which, in turn, sharply reduces the current in cathode resistor 192.

In order to obtain good linearity from the sawtooth generator, condenser 190 is large enough so that its potential does not appreciably drop during the period condenser 187 is being charged.

The wave form output from tube section 191 is shown in Figure 2, chart L. It is apparent that the peak voltage of the sawtooth wave form corresponds very closely to the duration between the start and stop pulses on the circuit input.

The sawtooth potential derived from sawtooth generator 185 is impressed on peak rectifier tube 195. The rectified potential is impressed on D. C. voltmeter 196.

*Multiplexing*

The device of the present invention admits of the communication of several pieces of information on the time space allotted to one signal by a multiplexing operation. For example, a number of A. C. signals can be sent simultaneously in any channel so long as the peak-to-peak shift of the channel pulse does not exceed the permitted limits, and the frequencies do not exceed one-half the repetition frequency. After detection, these frequencies can be separated by means of filters and utilized to energize relays or to perform other functions.

The multiplexing flexibility of the system herein disclosed also admits of several D. C. signals in any channel by utilization of a time sharing technique. An A. C. voltage is used to switch the phantastron modulator between two different D. C. inputs so that each input is effective approximately one-half the time. The switching is accomplished electronically and, in the preferred embodiment, at a 40-cycle per second rate. The output of such a channel after detection is electronically switched between two indications in synchronism with the switching input into the modulator. For this purpose, a 40-cycle per second signal is transmitted over the same link.

The manner in which such multiplexing is accomplished is shown in Figures 9, 10, 11 and 12.

Figure 11:
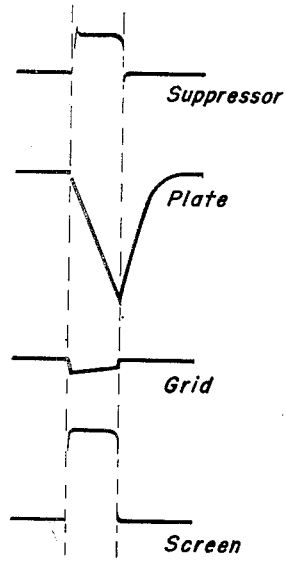
Figure 11 is a chart showing the electronic behavior of a component.
Figure 12:
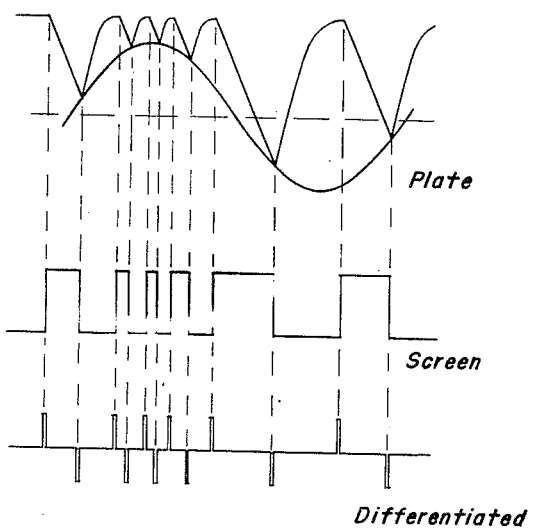
Figure 12 is a chart showing how alternating current and direct current signals are transmitted simultaneously.

Referring to Figure 9, modulator IA, it is seen that an A. C. potential can be impressed on modulator input stage 125 across ground and terminal 124 in addition to a D. C. potential across terminal 123 and ground. The variation in resistance of triode 126 in response to an A. C. input on stage 125 establishes an envelope for the sawtooth voltage generated by the screen coupled phantastron tube 127. The voltages on the elements of a phantastron tube are shown in Figure 11. The turn-off of this circuit is determined by the bottoming of the plate voltage and it is seen that the screen voltage falls abruptly at this point. Consequently, the length of the rectangular pulse generated by the screen is determined by that voltage at which the plate bottoms. It follows that an A. C. voltage on the input of stage 125 determines the resistance of tube 126 and therefore, the available voltage at the anode of phantastron tube 127. It follows that an A. C. variation of the anode voltage of the phantastron provides an envelope for the sawtooth voltage at the anode as shown in exaggerated form in Figure 12. This variation of the sawtooth peaks results in a sinusoidal variation in length of the sequence of screen rectangular voltages. This, when differentiated, gives a sinusoidal space time variation of generated pulses. It follows further that the simultaneous insertion of a D. C. and an A. C. signal voltage on the modulator input results in a mean delay corresponding to the D. C. input of the signal pulse from the channel coding pulse in the output of the mixer with a sinusoidally spaced time variation of the pulse at the A. C. rate and with a magnitude of the sinusoidal function which is proportional to the amplitude of the A. C. signal voltage. The combined transmitted channel coding pulses and the signal pulse for a combined A. C. and D. C. signal in channel I is as shown in Figure 13.

At the receiver, Figure 10, the signal pulse varies the flop time of flip-flop 189 at the same sinusoidal variation about the mean time of delay which was determined by the D. C. signal voltage. The sawtooth voltage generated in sawtooth generator 185 therefore varies in the same manner as demonstrated in Figure 12 for the transmitter. The peak values are rectified in tube 195 and are averaged by the D. C. voltmeter 196. The sinusoidal variation in peak value is separated from the D. C. potential by series condenser 198 and is impressed on A. C. voltmeter 199. The filter 197 is anti-resonant to the repetition rate, i. e., in the preferred embodiment, to 2500 cycles per second.

It is apparent from the description, supra, that several A. C. potentials can be impressed simultaneously on the transmitter modulator and separated by tuned filters to give a plurality of corresponding A. C. instrument readings at the receiver.

In the event that only A. C. signals are transmitted over a signal channel, a simple sawtooth generator of the type shown in Figure 14 is satisfactory and takes the place of the more complex sawtooth generator 185 shown in Figure 10 for duplex operation.

The manner in which several combinations of D. C. and A. C. signals can be transmitted in the time normally allotted to one signal is shown in Figure 15. The process for several D. C. signals is one of "time sharing." Diagrammatically, it is shown in a manner explained supra, that a D. C. and an A. C. signal can share a signal channel. Two A. C. signals of different frequencies $f_1$ and $f_2$ can also simultaneously share the same signal channel.

By the use of a synchronizing A. C. signal, two D. C. signals are transmitted in a time sharing scheme. The A. C. voltage is used to synchronize the transmitter and receiver so that the D. C. signal being received at any instant is directed to the instrument which is identified with the quantity selected to be measured in the transmitter.

Referring to Figure 15, the upper part of this figure shows how D. C. and A. C. signals are transmitted in single channels as explained supra. The lower part of this figure shows how two D. C. signals are alternately impressed on a time shared modulator 200. A synchronizing A. C. wave is utilized to alternately switch the input of the modulator from one D. C. source to the other. The A. C. wave is utilized both in its original form and in inverted form to accomplish the desired switching. Accordingly, an A. C. inverter 201 is included in the transmitter assembly. The receiver assembly is similar to that of the transmitter in that a time shared detector 205 is associated with A. C. inverter 210.

The A. C. signal utilized for synchronization is transmitted over the light beam in the manner illustrated in Figures 9 and 10.

The modulator system utilized in the transmitter for time sharing a signal channel between two D. C. signals is shown in Figure 16. Tube 127 is the phantastron rectangular wave generator similar to that shown in Figure 9, modulator IA. However, in this case, two D. C. input channels D. C.$_A$ and D. C.$_B$ are provided. Either one controls the phantastron as follows:

The grids of T$_2$A and T$_2$B are impressed with a large 40-cycle wave form of opposite phase. Assume T$_2$A is conducting and the potential on the grid of T$_3$A is depressed below cut-off. It follows that any signal on the grid of T$_1$A has no effect on phantastron 127. At the same time, T$_2$B having a large negative signal on its grid is cut off. It has no effect on T$_3$B and so any signal on the grid of T$_1$B controls phantastron 127.

When the phase of the A. C. synchronizing signals on T$_2$A and T$_2$B is reversed, the situation is reversed and T$_1$A has control, but T$_1$B does not have control.

In order to receive the two D. C. signals over one signal channel and read the signals on two corresponding instruments, the receiver is provided with a commutation circuit as shown in Figures 17 and 18.

The 40-cycle synchronizing signal is decoded in a circuit such as shown in Figures 10 and 14. This signal is then the same in frequency and phase as it is in the transmitter. It is impressed on a phase inverter 210 shown in Figure 18, and two similar but of opposite phase signals are obtained. Assuming the phase of the synchronizing wave form is as indicated in Figure 17, tube T$_5$A shorts out the D. C. signal entering tube T$_6$A so that meter A is not energized. Tube T$_5$B is open-circuited so the D. C. signal on the grid of tube T$_6$B registers on meter B. A half-cycle later of the synchronizing wave, tube T$_6$A is in control and indicates on meter A. The time constants in the meter circuits are such that there is no appreciable flicker of the instruments.

Figure 18 shows the circuit of Figure 17 in more detail. The A. C. synchronizing signal is impressed on inverter tube 210. Therefore, two similar synchronizing waves of opposite phase are produced and are indicated as "E" phase and "F" phase. The time intervals between a channel coding pulse and two signal pulses, respectively, are translated into corresponding sawtooth wave forms in sawtooth generator 211. The output of the sawtooth generator is inserted in tube 212 and the cathode output thereof is impressed in parallel on the grids of peak rectifier tubes 213 and 214. Rectifier tubes 213 and 214 are commutated by control tubes 215 and 216, respectively. When "E" phase of the synchronization wave is positive, control tube 215 drags the grid of rectifier tube 213 below cut-off with respect to the cathode and so tube 213 is inactivated. At the same time, "F" phase is negative and control tube 216 is open. Consequently, tube 214 is active and activates meter "F." The situation is reversed when the synchronizing wave is in opposite phase so that the grid of tube 214 is cut off with respect to the cathode and so tube 214 is inactivated. "E" phase being negative, opens control tube 215 thereby activating tube 213 and causing meter "E" to read. The situation is reversed on the next half-cycle of the synchronizing wave and, accordingly, meters "E" and "F" are alternately activated in synchronism with the D. C. signals applied to the transmitter.

It has been discovered that a telemetering system utilizing light beam transmission encounters distortion of the shape of the transmitted impulses which can be deleterious. This effect is a trailing edge undershoot of positive light pulses even though positive polarity rectangualr pulses are impressed on the control grid of tube 133. The trailing edge undershoot is susceptible to being mistaken by the receiver as a negative polarity transmitted pulse.

This undershoot effect is eliminated by providing pre-distortion of the positive pulses. The desirable pre-distortion takes the form of an asymptotic slope of the trailing edge of the pulses impressed on the glow tube. The effect is obtained by the inclusion of several pre-distorting networks as shown in Figure 9. One such network is in coder stage 111 and comprises resistors 136, 137 and 138. The respective values, substantially, of these parts are 510 ohms, 5.1K ohms and 0.05 microfarad. A second pre-distorting network comprises resistors 139 and 140, and condenser 141 in the cathode leg of coder stage 112. The values of these parts are 5.1K ohms, 510 ohms and 0.05 microfarad, respectively.

A third compensating network is in the coupling system in mixer 56 between tubes 132 and 129'. This network is a frequency compensating arrangement of capacitor 142, resistor 143, and series resistor 144. The recommended values for these parts are 0.015 microfarad, 1K ohms and 1K ohms, respectively. The compensating networks result in positive light pulses with no detectable undershoot.

A specific embodiment of a flexible and highly accurate telemetering system utilizing a light beam for transmission has been described. It is apparent that many variations in details are possible within the compass of the inventive scope of the system. Accordingly, it is understood that the presentation of specific values and embodiments is for the purpose of explanation and not limitation, and that the invention is limited only by the scope of the appended claims.

What is claimed:

1. In a telemetering system for transmitting a plurality of signals over a single carrier, means for generating electrical impulses of like polarity at even intervals, means for inverting some of said impulses, means for delaying, for an interval very short compared to said even interval, some of said inverted impulses and some of said impulses of original like polarity; means for combining said impulses of original like polarity, of inverted polarity, of delayed original polarity, and delayed inverted polarity whereby four separate, distinct channel identifying codes are generated.

2. In a telemetering system for transmitting a plurality of signals, means for generating four different code pairs for defining four channels, comprising a symmetrically cross-coupled phantastron oscillator, first, second, third and fourth cathode followers, means electrically connecting one phantastron screen output to the control grid of each of the first and third cathode followers, means electrically connecting the other phantastron screen output to the control grid of each of the second and fourth cathode followers; a scale-of-two, means electrically coupling the input of the scale-of-two to said phantastron, means electrically connecting one anode output of the scale-of-two to the control grids of the first and second cathode followers, means electrically connecting the other anode output of the scale-of-two to the control grids of the third and fourth cathode followers, whereby four separate sequential impulses of like polarity and of even intervening duration therebetween are generated with one each thereof being generated by each cathode follower, and means for combining said impulses into the said four different code pairs.

3. The device of claim 2 in which the means for combining impulses into four different code pairs comprises first, second, third and fourth grid controlled thermionic coder tubes, and a delay line having a first and second end, means electrically connecting the first, second, third and fourth cathode followers to the control grids of the first, second, third and fourth coder tubes, separate impedance means connected in series with the cathodes and anodes of the coder tubes; means electrically coupling the anode of the first coder tube, the cathode of the second coder tube, the cathode of the third coder tube and the anode of the fourth coder tube to the first end of said delay line, and means electrically coupling the anode of the first coder tube, the cathode of the second coder tube, the anode of the third coder tube and the cathode of the fourth coder tube to the second end of said delay line whereby at said second end of said delay line a sequence of four different code pairs of impulses is established being a pair of negative impulses, a pair of positive impulses, a negative and a positive impulse, and a positive and a negative impulse; means for generating signal impulses having a delay duration with respect to the corresponding code pair of impulses which is proportional to an observed electrical quantity, and means for electrically assembling in sequence on a single conductor each coded pair followed by its corresponding signal impulse.

4. The device of claim 3 in which the means for generating signal impulses having a delay duration with respect to the corresponding code pair of impulses comprises for each of said code pairs a modulator input tube and a phantastron sawtooth generator including a pentode, an impedance connected in series with the anode of the pentode and a source of anode potential, and a grid controlled phantastron control tube having its cathode and anode connected respectively to the phantastron anode and the source of anode potential, means electrically connecting the modulator tube anode to the grid of the said phantastron control tube, means for impressing an observed potential on the input grid of the modulator tube, means for impressing the impulse generated by the first cathode follower on the phantastron suppressor grid whereby the generation of a sawtooth wave form is initiated, and the period of said wave form is determined by the potential impressed on the input of the modulator, means for connecting the screen grid of the phantastron to a differentiating circuit and to a unidirectional coupling device having a polarity such that only a negative impulse corresponding to the end of the sawtooth wave is present in the output of the unidirectional coupling device whereby said impulse has a delay with respect to the corresponding code pair which is proportional to the potential impressed on the input of the modulator.

5. The device of claim 4 in which the means for assembling the code pairs and corresponding signal impulses in sequence comprises three triodes, means connecting the second end of the delay line to the control grid of one of said triodes, means connecting the output of the unidirectional device to the control grids of the first and second triodes, means electrically connecting the third and fourth triode anodes together and to the input of a cathode follower and a one-stage amplifier, means connecting the output of the amplifier to a light emitter whereby said code pairs of impulses and said signal impulses are translated into light intensity impulses.

6. The device of claim 5 in which the modulator has a plurality of input terminals of which one input terminal is for the impression of a D. C. potential to be observed and the remaining terminals are for alternating signals of different frequencies whereby the signal light intensity impulses vary sinusoidally in accordance with the A. C. signals about a mean position delayed from the corresponding code pair by a duration proportional to the D. C. signal.

7. In combination with a telemetering light beam transmitter adapted to transmit intelligence in a plurality of distinctively coded channels by respective duration between channel identifying code pairs and signal impulses, a receiver for translating the duration between light intensity impulses into electric quantities, comprising a light-sensitive translator for translating light intensity variations into electric impulses, a pair of cascaded amplifier stages for amplifying all impulses generated by the light-sensitive receiver, a delay line having a first and a second end, means electrically connecting one end of the delay line to the output of the amplifier and a delayed signal bus connected to the second end of the delay line, a normal signal bus connected directly to the output of the cascaded amplifier, means electrically connecting the normal signal bus to the control grid of a first decoder tube, an impedance in series with the cathode of the first decoder tube whereby a signal of normal polarity is generated on the first decoder cathode, tube means connecting the normal signal bus to a phase inverter tube to the grid of a second decoder tube whereby inverted impulses of normal timed occurrence are generated at the cathode of the second decoder tube, means connecting the delay signal bus to the grid of an inverted tube and means connecting the anode of the inverter tube to a third decoder tube whereby delayed signals of normal timing are generated at the anode of the third tube and delayed inverted signals are generated at the cathode of the third decoder tube, and means connected to the outputs of each of the decoder tubes for generating channel identifying impulses corresponding to received channel code pairs.

8. The device of claim 7 in which the means for generating channel identifying impulses comprises first, second, third and fourth time-coincidence circuits each comprising a thermionic tube having at least two control grids and being cut off in the absence of two positive impulses simultaneously impressed on the said control grids, means for connecting the normal signal bus to one control grid of the first and fourth coincidence tubes, means connecting the anode of the third decoder tube to the second control grid of said first and said third coincidence tubes, means electrically connecting the cathode of the second decoder tube to the first control grid of the second and third coincidence tubes, means connecting the cathode of the third decoder tube to the second control grid of the second and fourth coincidence tubes whereby each of said coincidence tubes generates at its anode an impulse corresponding to the first, second, third and fourth channel coding impulse pairs.

9. The device of claim 8 in which the means for sorting each corresponding signal impulse into its respective channel comprises for each channel, a first, second, third and fourth signal decoding triode, means connecting the cathode of the first decoder tube to the grids of the first and second signal decoding triodes, means electrically connecting the cathode of the second decoder tube to the grids of the third and fourth signal decoding triodes, an anode loading impedance connected to each of the anodes of the signal decoding triodes whereby sequential signal impulses in each of said channels are generated in sequence at the anodes of the signal decoding triodes.

10. The device of claim 9 in which the means for generating a sawtooth wave form for each signal comprises a flip-flop circuit having start and stop terminals and a sawtooth generator, means connecting the start terminal of the flip-flop circuit to the output of one of said coincidence circuits and means electrically connecting the stop terminal of the flip-flop circuit to the anode of one of said signal decoding triodes for the corresponding channel, means connecting an anode of the flip-flop circuit to the input of the sawtooth generator whereby a sawtooth wave form is generated having a length and magnitude corresponding to the duration between the impression of the start and stop impulses on the flip-flop circuit.

11. The device of claim 10 in which the means for rectifying the sawtooth wave form is a biassed triode having a biassing resistor connected in series with its cathode, means for impressing the output of the sawtooth generator on the control grid of the biassed triode, and means connecting a capacitor in shunt with the cathode biassing resistor whereby a unidirectional potential is generated at the cathode of the biassed triode and the magnitude of the said unidirectional potential corresponds to the peak amplitude of the sawtooth wave form.

12. In combination with a telemetering light beam transmitter adapted to transmit a direct current and an alternating current quantity of selected frequency in which the duration between an initiating light impulse and the mean position of a signal light impulse corresponds to the magnitude of a direct current quantity and in which the amplitude of swing of the said signal light impulse about its mean position at the selected frequency corresponds to the magnitude of the alternating current quantity; a receiver for translating the light impulses into electrical impulses comprising means for generating a sawtooth wave form having a length and magnitude corresponding to the duration between the initiating light impulse and the signal light impulse, means for peak rectifying said sawtooth wave form and impressing the average thereof on a direct current instrument, a filter tuned to the selected frequency connecting the means for peak rectifying the sawtooth wave form and an alternating current instrument.

13. In combination with a telemetering transmitter adapted to transmit direct electrical quantities in a plurality of distinctively coded channels by respective deviations between channel identifying code pairs of impulses and the mean position of corresponding signal impulses, and alternating electrical quantities by the amplitude of excursion of the signal impulses about the said mean position; a receiver comprising means for sorting the channel coding impulses into separate channels and means for sorting each signal impulse into its corresponding channel, means for generating a sawtooth wave form for each signal having an instantaneous length and magnitude corresponding to the duration between the signal impulse and the corresponding channel coding pair, means for rectifying each such sawtooth wave form, means for impressing the unidirectional potential so created on a peak reading voltmeter, blocking means tuned to the frequency of repetition of said channel coding impulses impressing said A. C. potentials on A. C. reading instruments.

14. In a telemetering system, a transmitter comprising a source of timing impulses, means for delaying said timing impulses for a selected duration, means for mixing some of said timing impulses and said delayed impulses to produce couplets of impulses of like polarity spaced by said selected duration, means for inverting said delayed impulses, means for mixing some of said timing impulses and some of said delayed inverted impulses to produce couplets of impulses of unlike polarity with a spacing equal to said selected duration, means for inverting said timing impulses, means for mixing some of said inverted timing impulses and said delayed timing impulses to produce couplets of impulses of opposite polarity to the first mentioned couplets, and means for mixing some of said inverted timing impulses and said delayed impulses to produce couplets of impulses of opposite polarity to said second mentioned couplets whereby four distinct coding couplets are created.

15. The telemetering system of claim 14 including a rectangular impulse generator of the phantastron type, means coupling said timing impulse source to said phantastron impulse generator, means coupling a source of observed potential to said phantastron impulse generator to control the length of impulses generated therein, means for translating the trailing edge of the rectangular impulses into short impulses, means for mixing the coding couplets and the short impulses, and means for transmitting both said coding couplets and said short impulses.

16. In a telemetering system, a receiver adapted to translate received coding impulse couplets and short impulses following each of the coding couplets into indications of quantities corresponding to the duration between the couplets and the short impulses comprising converting means for converting said couplets into a single impulse corresponding in time to the second of the coding impulse couplets, detecting means for detecting each of the short impulses, a flip-flop circuit coupled to said converting means and a respective one of said detecting means to generate a rectangular wave, sawtooth generating means coupled to said flip-flop circuit to generate a sawtooth wave having a peak value corresponding to the length of the rectangular wave, means for peak rectifying said sawtooth wave means calibrated to indicate the aforesaid quantities.

17. In a telemetering system utilizing pulse time modulation, apparatus for transmitting two direct current quantities in one time position comprising a transmitter and a receiver, a timing wave source in said transmitter, means in said transmitter for transmitting said timing wave, detecting means in said receiver for detecting said timing wave, a first modulation channel and a second modulation channel in said transmitter each having its input connected to a direct current quantity to be observed, a gating means connected to each of said modulation channels and to a signal pulse generator, a phase inverter connected to said timing wave source, one of said gating means being connected to the timing wave source and the other gating means being connected to the output of the phase inverter whereby the signal pulse generator is activated by the modulation channels alternately, signal detecting means in said receiver for detecting the signal pulses generated by the signal pulse generator, an inverter in said receiver for inverting the received timing wave, a first peak rectifier and a second peak rectifier connected to the signal detecting means, indicating instruments connected respectively to the peak rectifiers, means coupling the first peak rectifier to the timing wave detecting means, and means coupling the second peak rectifier to the timing wave inverter whereby each indicator is commutated with a respective modulation channel in said transmitter.

18. In combination with a Van de Graaff type generator, a telemetering system for providing communication links between the generator high voltage head and an observation station comprising a telemetering receiver mounted on said generator head, an electrical supply generator coupled to the Van de Graaff head trunnion for supplying energization potentials to said receiver, said receiver including a light-sensitive detector for sensing light impulses, a dielectric tube between the Van de Graaff head and base, means supporting the light-sensitive detector at the top of the tube, a light-emitting device supported in the bottom of said tube, a telemetering transmitter at said observation station and means electrically connecting the light-emitting device and the telemetering transmitter.

References Cited in the file of this patent

UNITED STATES PATENTS

| Number | Name | Date |
|---|---|---|
| 2,240,800 | Rigert | May 6, 1941 |
| 2,468,703 | Hammel | Apr. 23, 1949 |
| 2,485,584 | Ginzton | Oct. 25, 1949 |
| 2,499,613 | Thompson | Mar. 7, 1950 |
| 2,504,975 | Grieg | Apr. 25, 1950 |
| 2,537,056 | Hoeppner | Jan. 9, 1951 |
| 2,564,824 | White | Aug. 21, 1951 |
| 2,567,862 | Van Voorhis | Sept. 11, 1951 |
| 2,578,643 | Hayslett et al. | Dec. 11, 1951 |
| 2,607,035 | Levine | Aug. 12, 1952 |